United States Patent [19]

Rickmers et al.

[11] Patent Number: 4,711,032
[45] Date of Patent: Dec. 8, 1987

[54] PORTABLE SAW MILL

[75] Inventors: Clifford P. Rickmers; Robert D. Donovan, both of Tupelo, Miss.; Louis C. Brickner, Jr., Pittsburgh, Pa.

[73] Assignee: Delta International Machinery Corp., Pittsburgh, Pa.

[21] Appl. No.: 772,898

[22] Filed: Sep. 5, 1985

[51] Int. Cl.$^4$ .............................................. B27B 15/02
[52] U.S. Cl. ........................................ 30/372; 30/380
[58] Field of Search .................... 30/371, 372, 380; 83/745, 814

[56] References Cited

U.S. PATENT DOCUMENTS

| | | | |
|---|---|---|---|
| 1,987,551 | 1/1935 | Edwall | 143/19 |
| 2,722,953 | 11/1955 | Lee | 30/380 |
| 2,963,054 | 12/1960 | Eschemborg | 83/814 X |
| 3,115,909 | 12/1963 | McManama | 143/19 |
| 3,168,127 | 2/1965 | McManama | 143/19 |
| 3,213,905 | 10/1965 | McManama | 143/19 |
| 3,225,799 | 12/1965 | Hayden et al. | 143/32 |
| 3,344,819 | 10/1967 | Mitchell | 143/36 |
| 3,374,812 | 3/1968 | McManama | 143/19 |
| 3,434,514 | 3/1969 | McManama | 83/745 |
| 3,530,908 | 9/1970 | Crow | 143/19 |
| 3,721,146 | 3/1973 | McManama | 83/795 |
| 3,864,830 | 2/1975 | Haddon | 30/371 |
| 3,926,086 | 12/1975 | Crane | 83/801 |
| 4,070,757 | 1/1978 | Granberg et al. | 30/371 |
| 4,122,604 | 10/1978 | Brown | 30/371 |
| 4,134,203 | 1/1979 | Grube | 30/371 |
| 4,146,962 | 4/1979 | Grube | 30/371 |
| 4,244,104 | 1/1981 | Grube | 30/371 |
| 4,258,600 | 3/1981 | Jackson | 83/574 |
| 4,276,693 | 7/1981 | Lovas et al. | 30/380 |
| 4,332,084 | 6/1982 | Lovas et al. | 30/380 |
| 4,333,236 | 6/1982 | Lovas et al. | 30/380 |

OTHER PUBLICATIONS

The Best Idea, (brochure).
A New System of Operation, (brochure).
The Ross Bandmill, 1984 (brochure).
Introducing the Wood Mizer, the Saw that Pays Off Big (brochure).
From Forest to Final Form (brochure).
Now You Can Make High Quality Lumber with your Chain Saw and the Mil-Rite (brochure).
Sperber Portable Sawmills (brochure).
Model 30 Features and Specifications (brochure).
News and Notes (brochure), 6-7/82.
Portable Chain Saw Mill-10/9/82, pp. 259-264.
Advertisement for Sperber Portable Sawmill, Feb./-Mar., 1985.

Primary Examiner—Douglas D. Watts
Attorney, Agent, or Firm—Merchant, Gould, Smith, Edell, Welter & Schmidt

[57] ABSTRACT

A portable sawmill (20) having a frame (22) adapted to be disposed transversely of a log (24). A pair of horizontally spaced apart wheels (26a,b) are adapted to straddle the log (24). The wheels (26a,b) are rotatably supported by the frame (22) for rotation in a substantially vertical plane. A band saw blade (28) is trained around the wheels (26a,b) and for movement transversely of the log (24). An engine (30) is provided for rotating at least one of the wheels (26a,b) to cause the band saw blade (28) to form a cut in the log (24) as the frame (22) is moved longitudinally along the log (24). An elevating assembly (44) is provided for supporting the frame (22) so as to enable vertical adjustment of the band saw blade (28) relative to a top surface of the log (24). Guide rollers (40) are interconnected through the frame (22) for guiding the frame (22) along the log (24).

10 Claims, 11 Drawing Figures

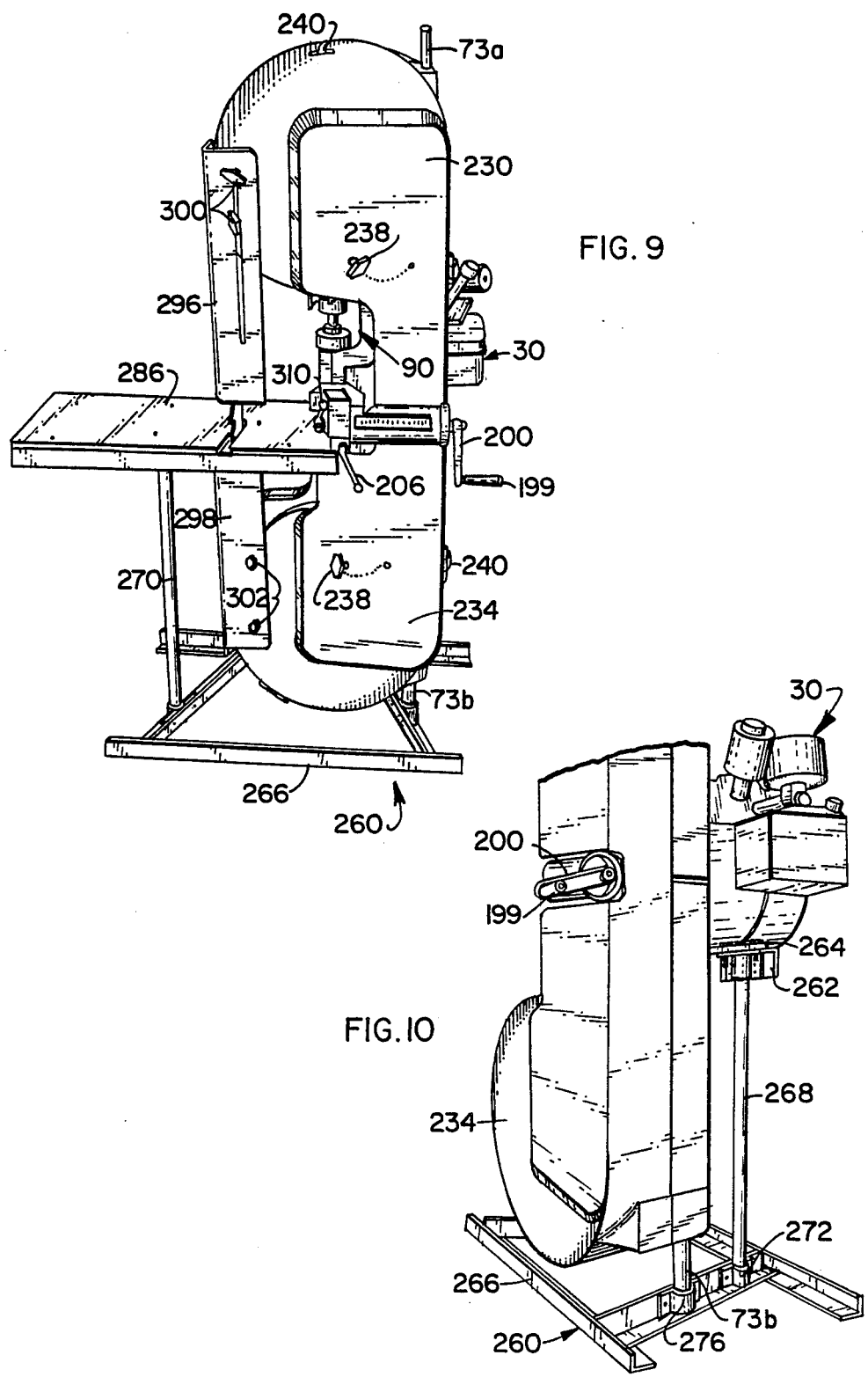

PORTABLE SAW MILL

BACKGROUND OF THE INVENTION

The present invention relates to a portable saw mill, and more particularly, the present invention relates to a portable saw mill utilizing a horizontal traversing band saw.

In recent years, there has been a demand for saws capable of cutting lumber from felled logs. More particularly, there has been a demand for such saws which are readily portable. Such saws are in demand because they eliminate the need to transport logs from the forest and to a saw mill, resulting in a savings in fuel and labor. Additionally, such portable saws enable lumber to be produced in remote locations where it is intended to be used. Additionally, portable relatively inexpensive saw mills are ideal for the occassional user who might have a few acres of woodland and wishes to harvest some lumber therefrom.

So-called Alaska mills have been on the market. Such mills normally include attachments for standard chain saws to enable chain saws to cut boards from felled logs. Since saw chains are designed to cut transverse to the grain and not longitudinally thereof, such mills have not been as efficient as desired. Moreover, it has been difficult for even trained operators to cut straight boards efficiently with known Alaska mills. Also, so-called Alaska ladders must be nailed to the log before the first cut is made in order to assure that a straight cut is made. This step is time consuming and requires materials not always readily available in remote forest locations. Furthermore, such mills tend to amplify undulations in successive cuts, and when cutting long boards it is often necessary to drive wedges into the cut to prevent the board from pinching the saw chain. Also, a substantial amount of lumber is wasted because of the relatively wide kerf of a saw chain.

Various types of portable band saws are known for cutting lumber from felled logs. An example of such a saw may be found in U.S. Pat. Nos. 4,332,084; 3,721,146; and 4,276,693. The present invention overcomes many of the problems associated with currently available portable band saws.

SUMMARY OF THE INVENTION

The present invention relates to a portable saw mill for cutting lumber from a log. The portable saw mill includes a frame adapted to be disposed transversely of the log. A pair of horizontally spaced apart wheels are adapted to straddle the log, the wheels being rotatably supported by the frame for rotation in a substantially vertical plane. A band saw blade is trained around the wheels for movement transversely of the log. Means is provided for rotating at least one of the wheels to cause the blade to form a cut in the log as the frame is moved longitudinally along the log. Vertically adjustable support base means is provided for supporting the frame so as to enable vertical adjustment of the band saw blade relative to a top surface of the log. Roller means are interconnected to the frame for guiding the frame along the log as the frame advances longitudinally of the log, whereby the blade is kept in a zone of cutting as the blade cuts the log lengthwise. The support base means includes a platen and means for levelling the platen relative to the saw blade. Handle means are interconnected to the frame for facilitating movement of the frame longitudinally of the log by a user.

With the foregoing in mind, a primary object of the present invention is to provide an improved portable saw mill which is capable of cutting lumber efficiently from felled logs.

It is another object of the present invention to provide a portable saw mill utilizing a band saw horizontally traversing the log.

A further object of the present invention is to provide a portable saw mill which is capable of being used by even relatively unskilled workmen to cut relatively smooth and accurately dimensioned lumber.

Yet another object of one embodiment of the present invention is the provision of tracking adjustment means for adjustably aligning the wheels with the band saw blade, whereby the blade properly tracks the wheels.

It is an object of one embodiment of the present invention to provide a frame which includes three rail members interconnecting the spaced apart wheels and extending transversely of the log. A first pair of the rail members straddle the wheels with at least one of the wheels being slidably mounted on the rail members. A third one of the rail members lies in substantially the same vertical plane as that of the wheels.

Yet another object of one embodiment of the present invention is to provide tension means for adjusting blade tension.

As another object, one embodiment of the present invention provides for pivotal mounting of the internal combustion motor which powers the portable saw mill such that the saw mill can be operated in a vertical orientation as a vertical band saw.

Yet another object of one embodiment of the present invention is the provision of cooperating guide rail assembly means positioned longitudinally of the log for cooperating with roller means to guide the frame as the frame advances longitudinally of the log.

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the present invention.

BRIEF DESCRIPTION OF THE DRAWINGS

In the drawings, in which like reference numerals and letters indicate corresponding parts throughout the several views;

FIG. 9 is a side elevational view illustrating the embodiment of the portable saw mill shown in FIG. 1 converted to an upright band saw;

FIG. 10 is an elevational view generally looking at a top portion of the embodiment of the portable saw mill illustrated in FIG. 1 when converted to an upright band saw.

DETAILED DESCRIPTION OF THE PREFERRED EMBODIMENT

Figure 1:
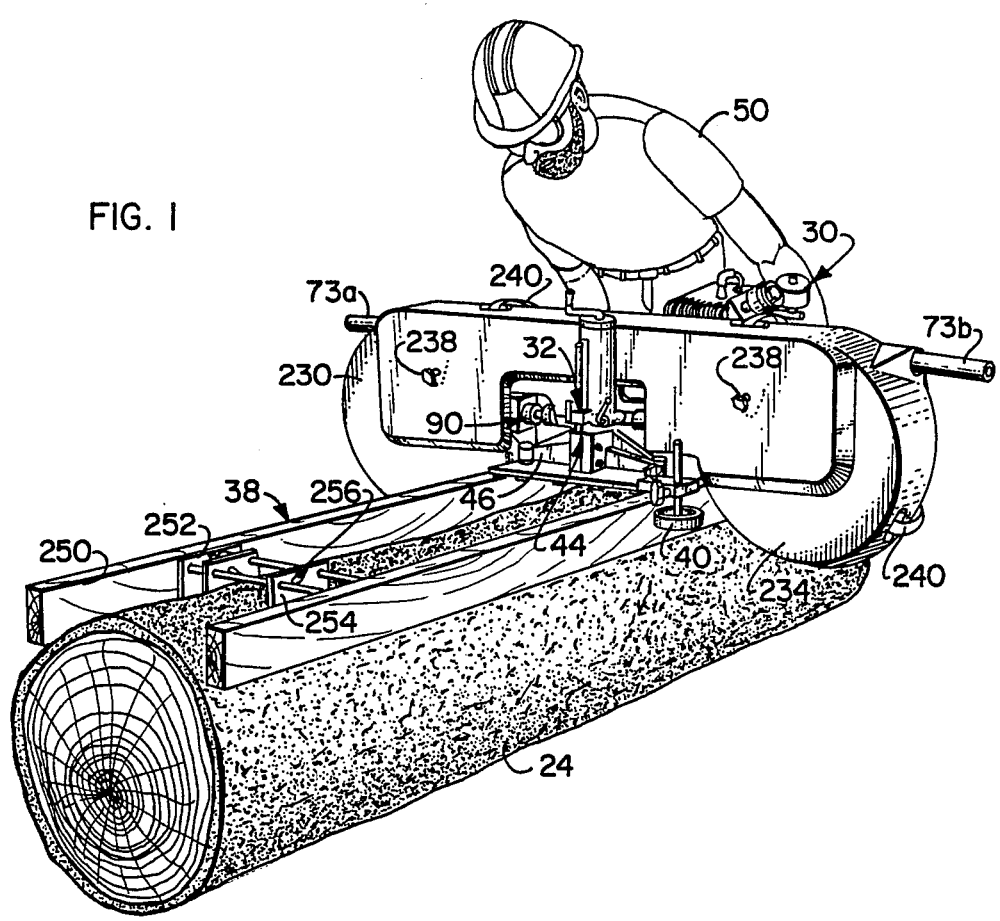
FIG. 1 is a view in perspective illustrating an embodiment of the present invention in use.
Figure 7:
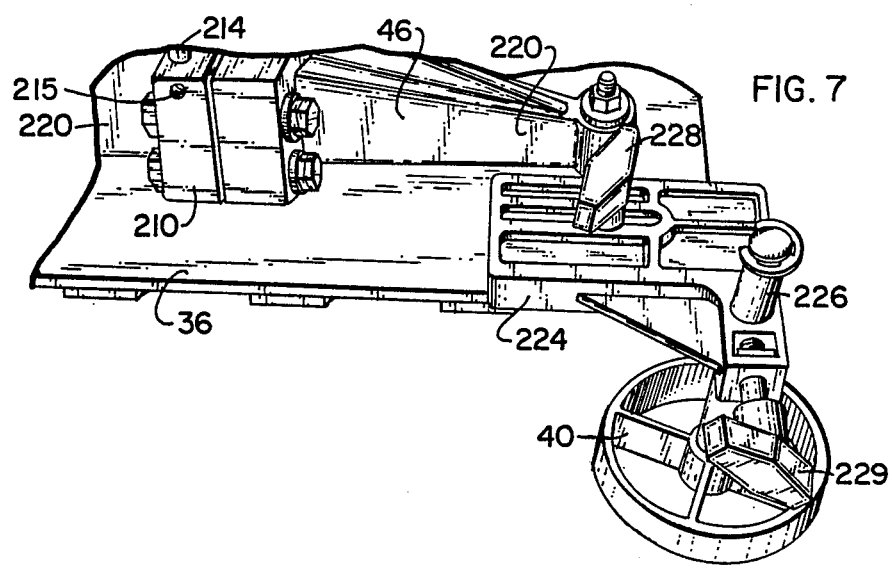
FIG. 7 is a partial enlarged view illustrating one of the guide roller assemblies of the embodiment of the portable saw mill shown in FIG. 1.

Referring now to the drawings, there is illustrated in FIGS. 1 through 8 a preferred embodiment of the portable saw mill, generally designated by the reference numeral 20, of the present invention. The portable saw mill 20 includes a frame 22 adapted to be disposed transversely of a log 24. A pair of horizontally spaced apart wheels 26a,b are rotatably supported for rotation in a generally vertical plane by the frame so as to straddle the log 24. A band saw blade 28 is positioned around the wheels 26a,b for movement transversely of the log 24 in the generally vertical plane. An internal combustion engine 30 is interconnected to the wheel 26b for rotating the wheel 26b whereby the blade 28 is made to form a cut in the log 24 as the frame 22 is moved longitudinally along the log 24. A vertically adjustable support base 32 supports the frame 22 so as to enable vertical adjustment of the band saw blade 28 relative to a top surface of the log 24. The support base 32 includes a platen 36 which slides along the top surface of the log 24 or a guide rail assembly 38 as illustrated in FIG. 1. The guide rail assembly 38 is typically utilized when cutting a side of the log 24 which has not previously been cut so as to be relatively flat. Guide rollers 40 are interconnected to the platen 36 for guiding the frame 22 along the log 24 as the frame 22 advances longitudinally of the log 24 whereby the blade 28 is kept in a zone of cutting as the blade 28 cuts the log 24 lengthwise. The platen 36 is interconnected to the frame 22 by an elevating assembly 44 which vertically adjusts the height of the frame 22 relative to the platen 36. The elevating assembly 44 is mounted on a pedestal 46 which in turn is interconnected to the platen 36 so as to enable levelling of the platen 36 relative to the band saw blade 28. Handles 48a,b are interconnected to a back side of the portable saw mill. During use an operator 50 stands behind the portable saw mill as generally illustrated in FIG. 1 and grasps the handles 48a,b.

Figure 2:
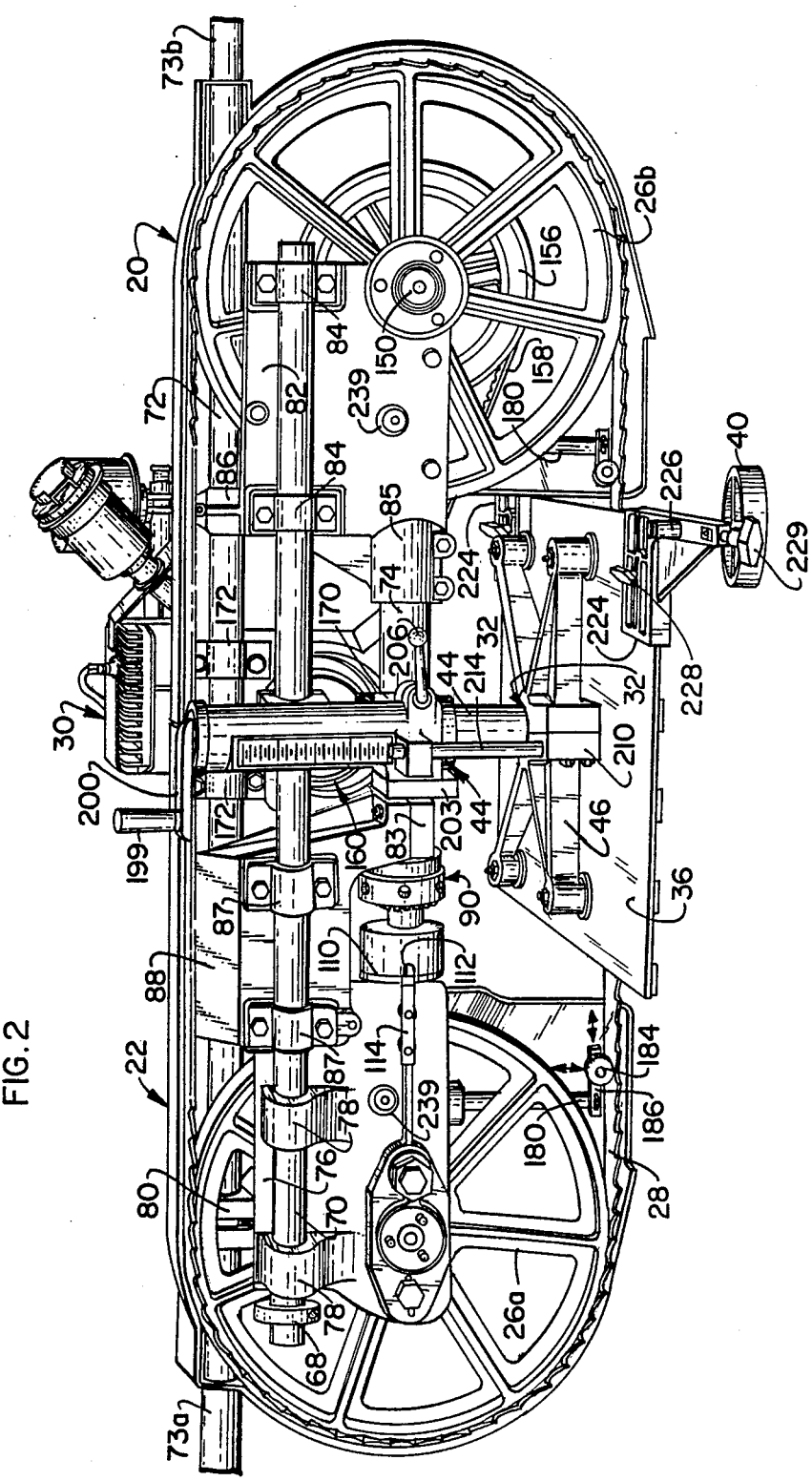
FIG. 2 is an enlarged front elevational view of the embodiment shown in FIG. 1 with the outer protective wheel covers removed.

More particularly, as illustrated in FIG. 2, the frame 22 includes three tubular rail members 70, 72, 74 which interconnect the wheels 26a,b and extend transversely of the log 24. The rail members 70, 72 generally straddle the wheels 26a, b. The wheel 26a is slidably mounted on the rail members 70, 72 by a generally U-shaped tension wheel frame portion 76. A collar member 68 is suitably fixedly secured to the rail member 70 to function as a safety stop preventing the wheel 26a from sliding past the end of the rail member 70. The tension wheel frame member 76 includes rail guide blocks 78, 80 which slidably receive the rail members 70, 72, respectively. The rail member 72 is slightly higher than the rail member 70 and extends beyond the sides of the portable saw mill 20 to form projections 73a, b which serve as handles for lifting the portable saw mill 20 and also serve as part of the support framework when the portable saw mill 20 is utilized in a vertical, upright configuration as generally illustrated in FIGS. 8 and 9 as a vertical band saw.

The wheel 26b is mounted on the rail members 70, 72 by a generally U-shaped wheel frame 82. The wheel frame 82 is fixedly mounted on the rails 70, 72 by clamp arrangements 84, 86. The rail member 74 is interconnected to the wheel frame 82 by a clamp arrangement 85 and to a stationary frame member 88 by a clamp arrangement 83. The frame member 88 is interconnected to the rail member 70 by clamp arrangements 87, to the rail member 72 by clamp arrangements (not shown), and to the tension wheel frame 76 by a tension mechanism 90 which is used for adjusting the tension of the band saw blade 28 by varying the spacing between the wheels 26a,b.

The three rail member frame arrangement is particularly useful since it enables various working elements of the portable saw mill 20 to be readily adjusted or configured to enable required operation.

Figure 8:
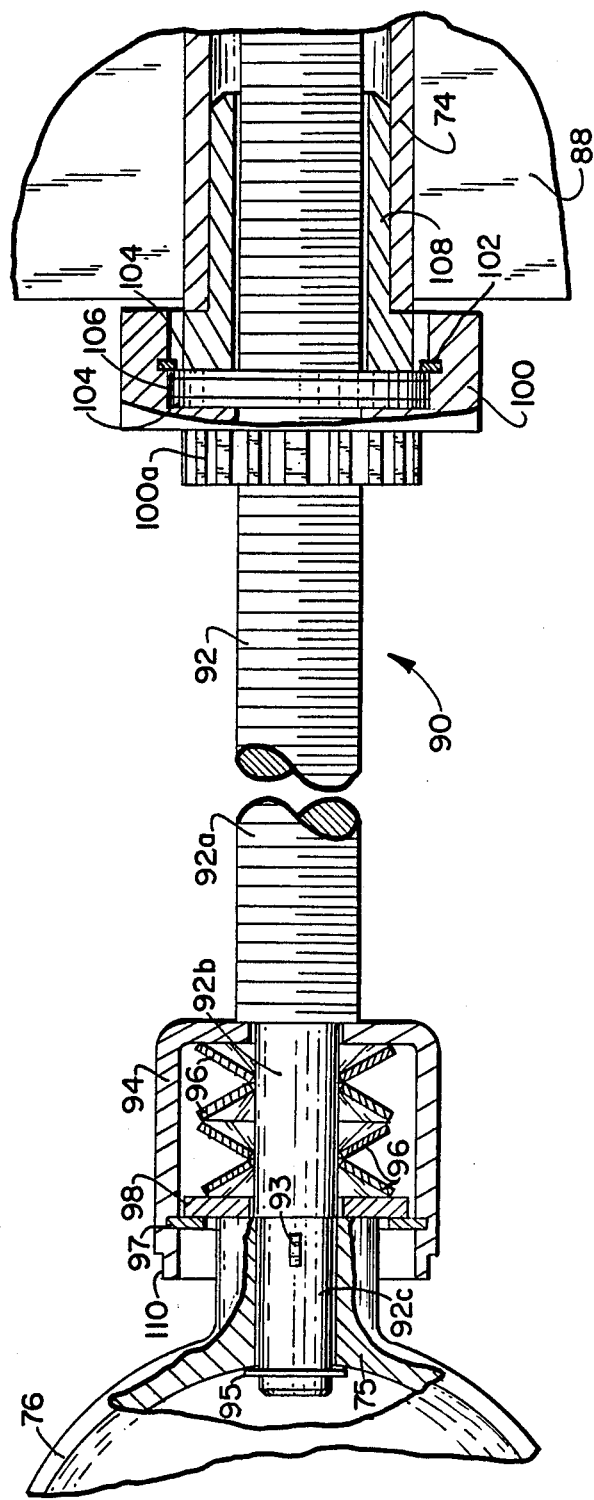
FIG. 8 is a partial enlarged, largely cross sectional view illustrating the tension mechanism of the embodiment of the portable saw mill shown in FIG. 1.

As illustrated in FIGS. 2 and 8, the embodiment of the tension mechanism 90 shown includes a cylindrical tension screw 92, a major portion 92a of which is threaded. One end of the tension screw 92 includes a portion 92b of reduced diameter and a portion 92c of further reduced diameter which are not threaded. The tension screw 92 is interconnected by a key member 93 to an inside surface of a hollow cylindrical projection 75 of the tension wheel frame 76 which receives the portion 92c so as to prevent relative rotational movement between the projection 75 and the tension screw 92. A retaining ring 95 prevents the tension screw 92 from being removed from the projection 75. A cylindrical tension spring housing 94 is axially positioned about the portion 92b of the tension screw and houses four disk spring washers 96, also referred to as Belleville washers, and a tension spring plate 98 which are in turn axially positioned about the end portion 92b of the tension screw 92. The spring housing 94 has an aperture of lesser diameter than the portion 92a such that the spring housing 94 abuts against the portion 92a which limits longitudinal axial movement of the spring housing 94 toward the tension screw portion 92a. A retaining ring member 97 retains the washers 96 and spring plate 98 in the housing 94. Threadedly interconnected to the threaded portion 92a proximate an opposite end of the tension screw 92 is a tension screw nut 100. The threaded portion 92a extends beyond the screw 100 and extends into the rail member 74 which is supported by the frame member 88. The screw nut 100 is interconnected to the frame member 88 by retaining ring 102, thrust washers 104, a thrust bearing 106 and a tension screw guide bushing 108 which projects into the rail member 74. The guide bushing 108 is preferably press-fitted or otherwise suitably secured in the rail member 74. The Belleville washers enable the tension mechanism to sustain relatively large loads with small deflections. By turning the screw nut 100 the tension screw 92 is caused to move relative to the screw nut 100, which remains stationary. In the embodiment shown, to properly tension the blade 28, the tension screw nut 100 is turned with a wrench positioned about portion 100a until a shoulder portion 110 of the tension spring housing 94 aligns itself with a notch 112 on a pointer member 114 fixedly secured to the tension wheel frame 76. Accordingly, as the tension wheel frame 76 is made to slide along the rail members 70, 72 by turning the tension screw nut 100, a proper tensioning of the band saw blade 28 can be ascertained by aligning the notch 112 with the shoulder portion 110 on the tension spring housing 94.

Figure 5:
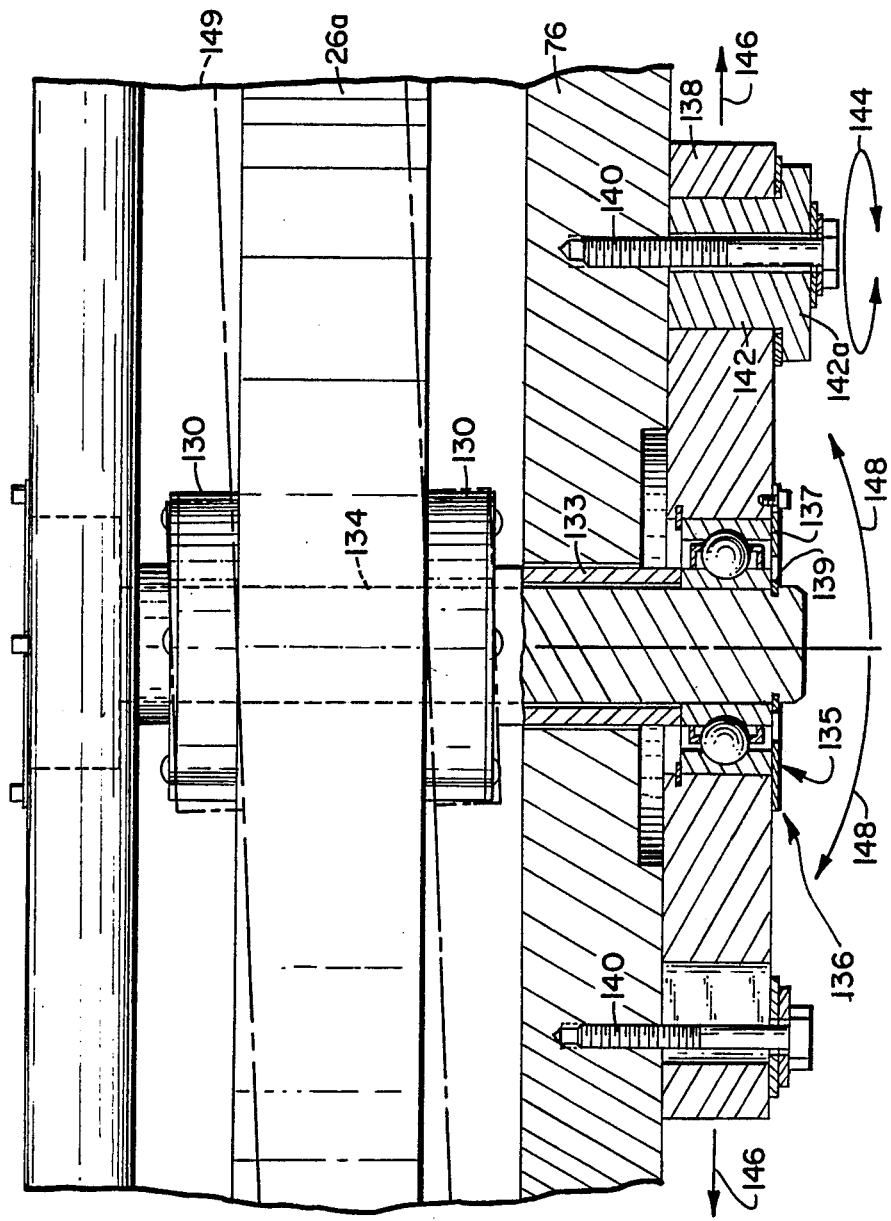
FIG. 5 is an enlarged partial sectional view illustrating the tracking adjustment assembly of the embodiment of the portable saw mill shown in FIG. 1.

As illustrated in FIG. 5, the tension wheel 26a is mounted in the tension wheel frame 76 by a bearing spacer assembly 130 for rotation about a shaft 134. Mounted on the tension wheel frame 76 is a tracking adjustment assembly 136 which includes a tracking plate 138 mounted on the shaft 134 by a spacer 133a, bearing 135, bearing retainer 137, and retaining ring 139 attached to the tension frame 76 by threaded fasteners 140. Concentrically positioned about one of the threaded fasteners 140 is an eccentric member 142. To adjust the alignment of the band saw blade 28 with the tension wheel 26a, the threaded fasteners 140 are loosened and the eccentric member 142 is turned clockwise to move the band saw blade 28 out or counterclockwise to move the band saw blade 28 in by attaching a wrench or the like to a head portion 142a of the eccentric member 142 so as to turn the eccentric member 142. A wrench or the like is used to hold the head portion 142a to prevent the eccentric member 142 from turning when the threaded fasteners 140 are loosened. The eccentric member 142 is then turned as required and the threaded fasteners 140 tightened.

As illustrated in FIG. 5, rotation of the eccentric member 142 as generally illustrated by arrows 144 causes movement of the tracking plate as generally indicated by arrows 146 which in turn caused pivoting of the shaft 134 and the wheel 26a as indicated by the arrows 148 depending on which direction the eccentric member 142 is turned. The phantom line 149 illustrates the wheel 26a in an alternate position.

Figure 4:
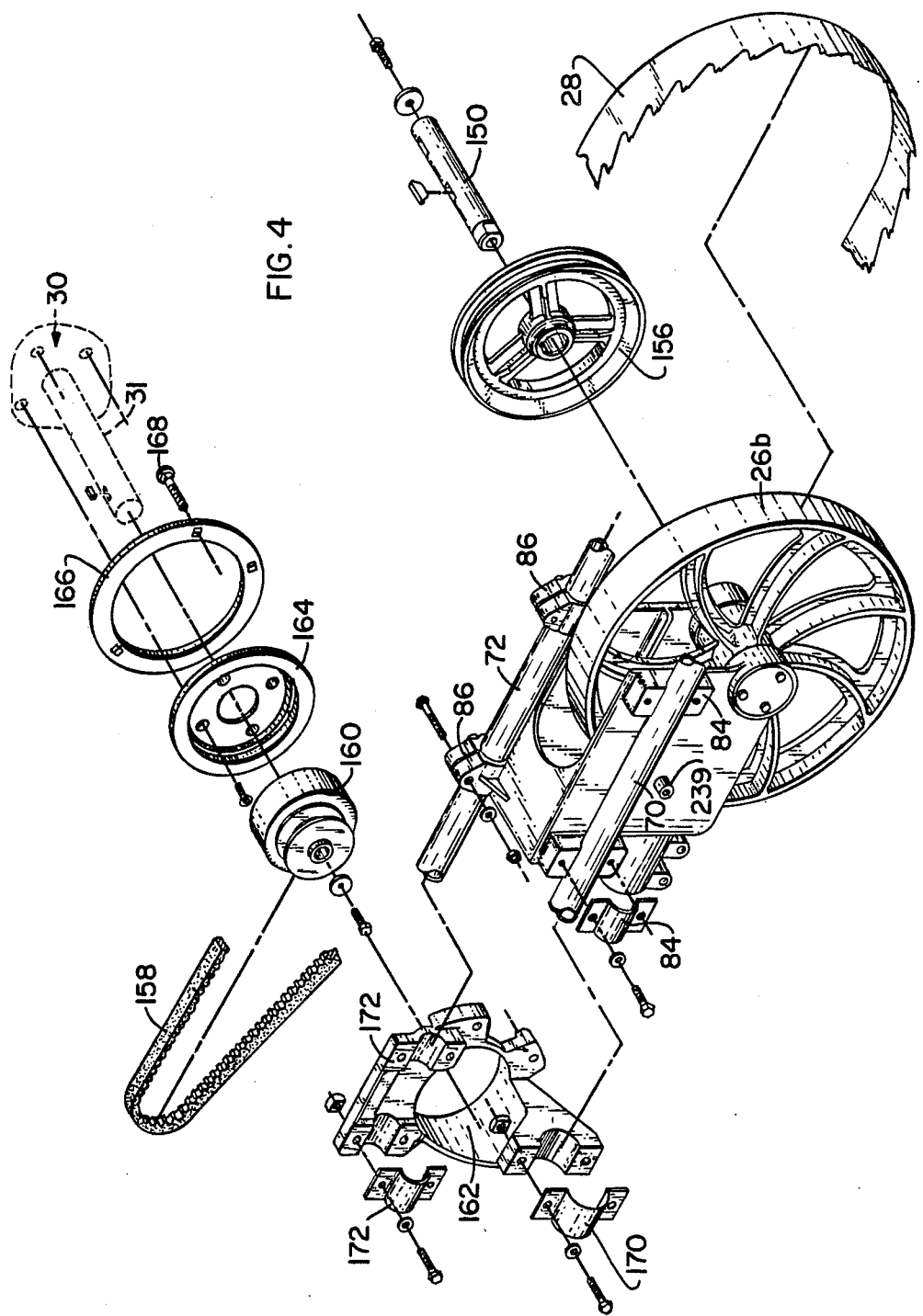
FIG. 4 is a partial exploded view illustrating the drive wheel arrangement and the engine mounting bracket for pivotally mounting the engine on the frame of the embodiment of the portable saw mill shown in FIG. 1.

As illustrated in FIG. 4, the drive end wheel 26b is rotatably mounted for rotation with a shaft 150. Also fixedly mounted on the shaft 150 for rotation therewith is a pulley 156 which is interconnected by a belt 158 to a clutch arrangement 160 of the engine 30, the clutch arrangement 160 being interconnected to the engine 30 by a drive shaft 31. The clutch 160 is in turn suitably mounted by a motor support member 162 to the rails 74, 72. The support member 162 is secured to the rail members 74, 72 by clamp arrangements 170 and 172, respectively. To adjust the tension in the belt 158, the clamp arrangements 170, 172 can be loosened and the support member 162 slid along the rail members 74, 72 as required, the clamp arrangements 170, 172 then being re-tightened. The clutch 160 and a turret 164 are interconnected to the engine 30. A retaining ring 166 connects these items to the support member 162. This configuration enables the engine 30 to be rotated simply by loosening threaded fasteners 168 interconnecting the retaining ring 166 to the motor support 162. Accordingly, this enables the portable saw mill 20 of the present invention to be utilized in a vertical, upright position upon rotating the engine 30 to a proper orientation. A throttle 174 is adjustably mounted on the handle 48a and is interconnected to the engine 30 by a throttle cable 176.

As illustrated in FIG. 2, guide bracket posts 180 are bolted to the wheel frames 76, 82 and positioned in back of the band saw blade 28 proximate each of the wheels 26a, b. A guide roller bearing 184 is interconnected to each of the guide bracket posts 180 by a bracket 186 such that the buide rollers 184 are positioned directly over the band saw blade 28 and are forcing down on the band saw blade 28. The guide bracket posts 180 are adjustable vertically, as are guide rollers 184. In addition, the bracket 186 is adjustable horizontally, such that the width or spacing between the two guide rollers 184 can be varied. The applicant has found that one preferred mode of operation is to lower the guide rollers 184 approximately one/eighth of an inch when the band saw blade 28 is in tension. This causes the guide rollers 184 to force down on the band saw blade 28 such that the band saw blade 28 is pulling up on the guide rollers 184. Accordingly, this assists in guiding the blade 28 such that the plane of cutting is maintained constant such that the occurrence of a wave-like cut is significantly reduced, or is entirely done away with.

Figure 6:
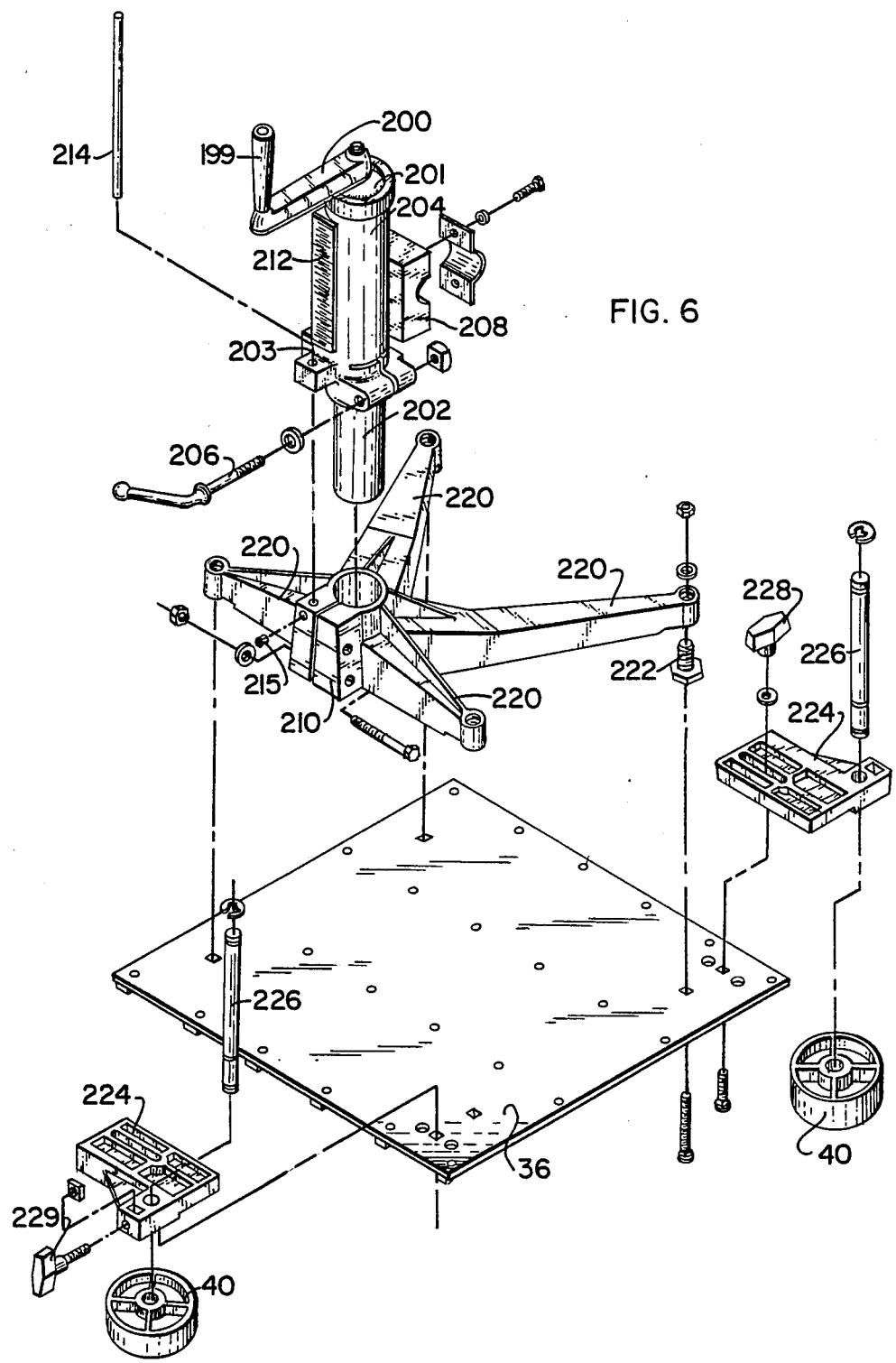
FIG. 6 is an exploded view illustrating the platen, pedestal, and elevating assembly of the embodiment of the portable saw mill shown in FIG. 1.

As illustrated in FIG. 6, the elevating assembly 44 includes a threaded elevating screw 200 and a column assembly 202 threadably interconnected thereto for relative movement away and toward each other by turning a handle member 199. A tubular support column 204 is interconnected to the elevating screw 200 by a retaining ring arrangement 201 for movement therewith and is releasably attached to the column assembly 202 by a lever and clamp arrangement 206. The tubular support column 204 is attached to the rail member 70 by a clamp arrangement 208. The support column 204 is vertically adjusted by rotation of the handle 199, whereby the frame 22 is raised and lowered relative to the platen 36. The pedestal 46 is in turn fixedly secured to the column assembly 202 by a clamp arrangement 210. A graduated scale 212 is positioned on the support column 204 as an aid in estimating the height of the platen by use of a cooperating pointer member 214 adjustably secured to the pedestal 46 by a set screw 215. The pedestal 46 includes four legs 220, each of which are secured to the platen 36 by leveling studs 222 to enable levelling of the platen by adjustment of the studs 222. (Not all four of the leveling studs 222 and not all the parts of the guide rollers 40 are illustrated in FIG. 6.) The front and back guide rollers 40 are interconnected to the platen 36 by suitable brackets 224 for rotation about a vertical shaft 226. The slotted brackets 224 are adjustably interconnected by threaded fasteners 228 to the platen 36 such that the rollers 40 can be placed at varying distances from the platen 36. The height of guide rollers 40 is adjusted by vertically sliding the shaft 226 which is then fixed in place by threaded fastener 229.

The wheels 26a,b are enclosed by right front and rear covers 230, 232 and left front and rear covers 234, 236. The front covers 230, 234 are attached to the frame by threaded fasteners 238 which are threaddedly received at 239 and by clamp assemblies (not shown) to the rail members. The rear covers 232, 236 are attached to the frame by the handles 48a,b which are threaded into the stationary frame 88 and the wheel frame 82, respectively. The handles 48a,b are suitably secured against the covers 232, 236 by a lock washer and lock nut arrangement 52. In addition, threaded fasteners 233 might also be utilized to assist in attaching the covers 232, 236 to the frame 22. The covers are in turn latched to one another by latch assemblies 240.

As previously discussed and as generally illustrated in FIG. 1, when cutting along a side of the log 24 which has not been previously cut so as to provide a substantially smooth surface for the platen 36 to slide on, a guide rail assembly 38 is preferably utilized to provide a substantially smooth surface for the platen 36 to slide on. The guide rail assembly 38 includes two transversely spaced apart guide rail members 250, such as wooden 2×4s, which extend longitudinally of the log 24. The transverse spacing between the guide rail members 250 is maintained by brackets 252 which are secured to the guide rail members 250. In a typical application, three of the brackets 252 are used, one each proximate the end and one proximate the middle. The brackets 252 include plate members 254 slidably received on the brackets 252. The guide rail assembly 38 is secured to the log 24 by securing the plate members 254 to the log 24 by driving spikes 256 or the like through apertures in the plate members 254 and into the log 24.

Figure 3:
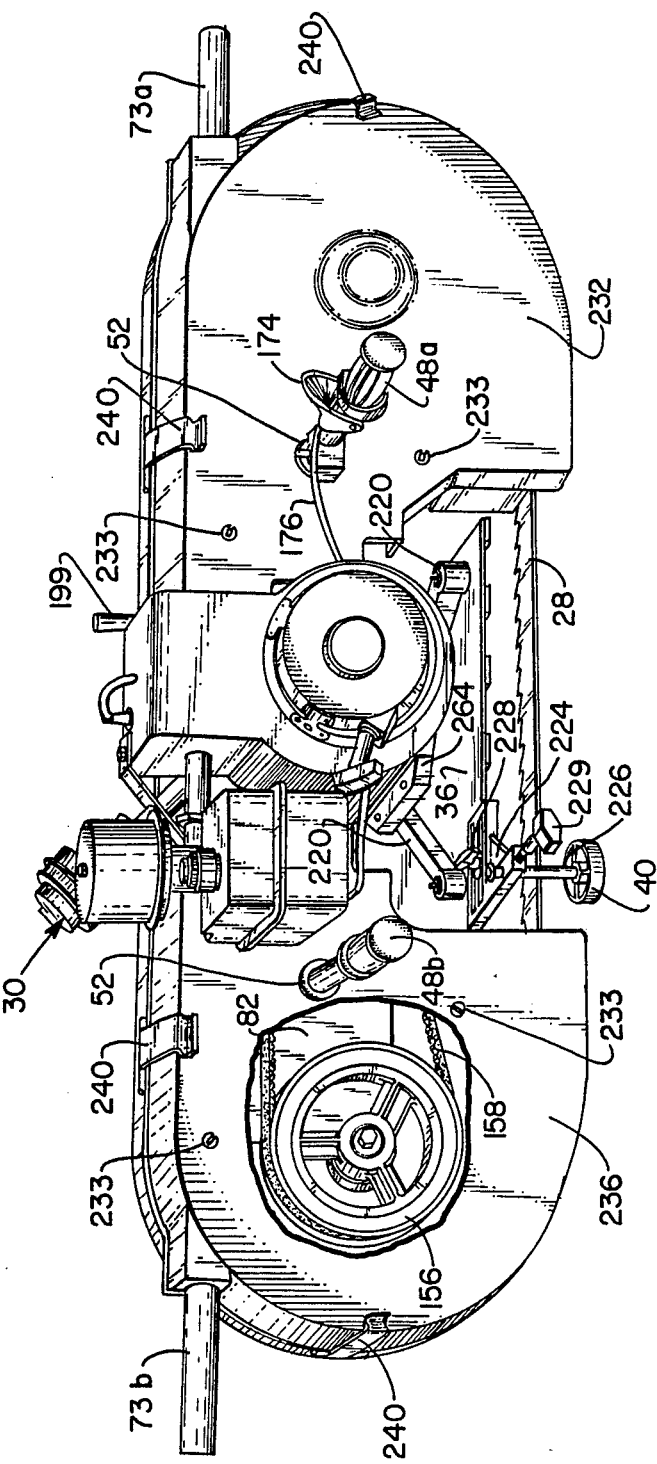
FIG. 3 is an enlarged back elevational view of the embodiment shown in FIG. 1 with the left rear protective cover partially cut away to show the belt and pulley arrangement which is interconnected to the drive wheel.
Figure 11:
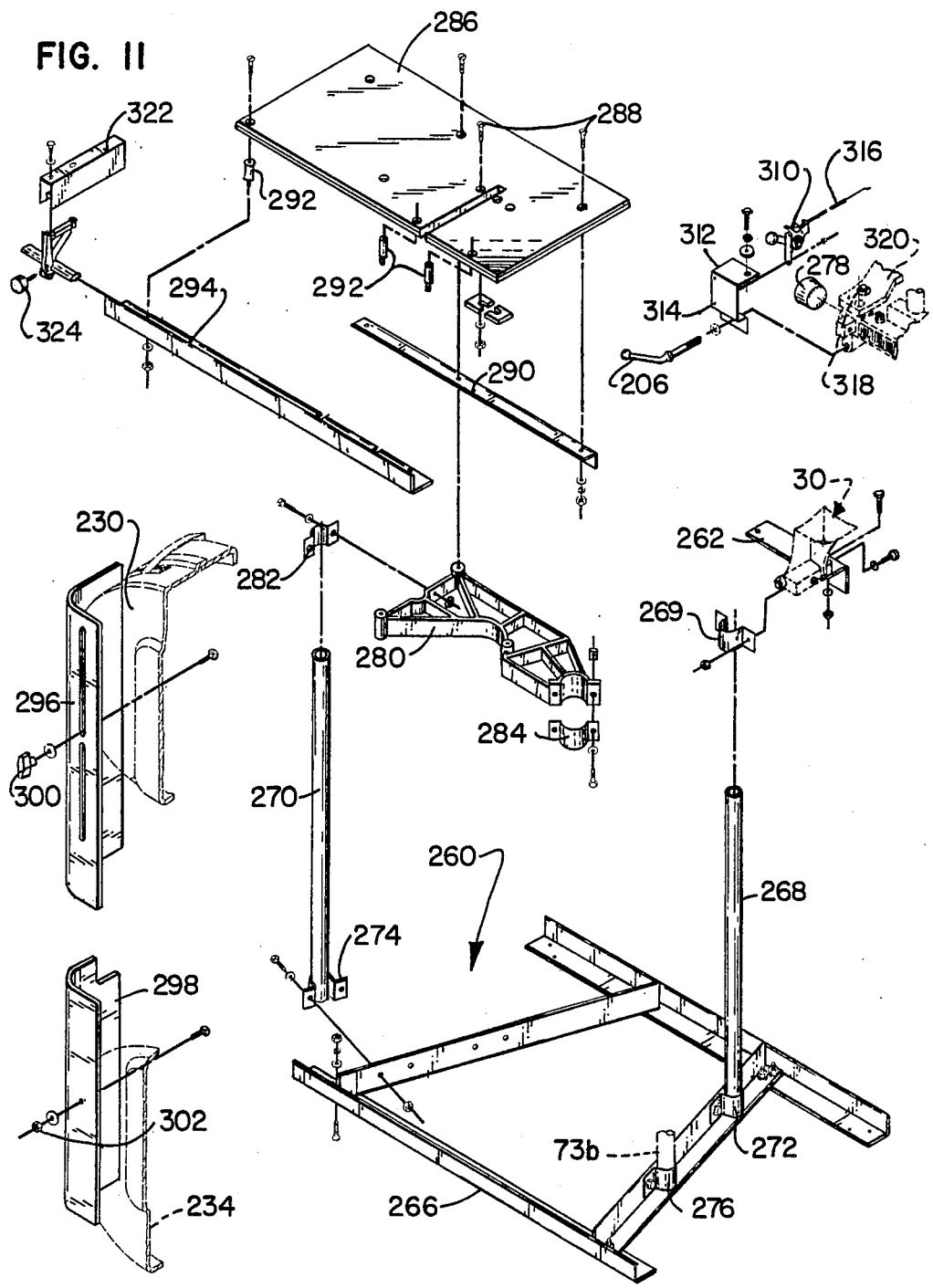
FIG. 11 is an exploded view of an embodiment of an attachment structure for converting the embodiment of the portable saw mill illustrated in FIG. 1 to an upright band saw as illustrated in FIGS. 9 and 10.

As previously indicated, a preferred embodiment of the portable saw mill 20 of the present invention is readily convertible into a vertical band saw, an embodiment of which is illustrated in FIGS. 9 and 10. The portable saw mill 20 is supported in the upright position by a frame 260, an embodiment of which is illustrated in additional detail in FIG. 11. To convert to the vertical configuration, a right angled bracket 262 is attached to a base portion 264 of the engine 30 by threaded fasteners. The bracket 262 extends across the backside of the engine 30 so as to interconnect the base portions on each side of the engine 30. (Only one side of the base portion 264 is seen in FIG. 3, although the opposite side is similar to that shown.) The throttle cable 176 is removed. A support base 266 is assembled. Two hollow support legs 268, 270 are attached by clamp arrangements 272, 274, respectively, to the support base 266. The threaded fasteners 168 are loosened to enable the engine to be rotated. The saw mill 20 is then stood in the upright position and the projection 73b of the rail member 72 is clamped to the base 266 by a clamp arrangement 276. The support leg 268 is attached to the bracket 262 by a clamp arrangement 269. The lever 206 of the elevating assembly 44 is loosened and the handle 199 turned until the platen 36 and its pedestal 46 can be removed from the support column 204. A plastic plug 278 is inserted into the end of a support column 204. A table support frame 280 is attached by a clamp arrangement 282 to the support leg 270 and by a clamp arrangement 284 to the rail member 74. The table support frame 280 is then attached to an underside of a table 286 by fasteners 288. A right angle support bracket 290 is fastened to the table 286. Spacers 292 are positioned under the table 286 and a fence guide rail member 294 is attached thereto. Upper and lower blade guards 296, 298 are attached to the right and left front covers by threaded fasteners 300, 302. A throttle control 310 is mounted to a bracket 312 by threaded fasteners 314. The throttle control 310 is interconnected to the engine by a throttle cable 316. The bracket 312 is then mounted on the support column 204 by a threaded fastener 318 threaded into a bracket member 320 of the clamp arrangement 203 which attaches the support column 204 to the rail member 74. In addition, the lever arrangement 206 is utilized to mount the bracket 312 on the support column 204. A rip member 322 is then positioned in the fence guide rail member 294 and secured into position by a handle member 324. Upon completion of this assembly, a vertical band of configuration is obtained is generally illustrated in FIGS. 9 and 10.

In use, the log 24 is suitably steadied so it cannot shift or roll. Typically, both ends of the log are marked at the center (heart center or average center) of the log. A horizontal center line is then drawn through the center across the end of the log 24. The guide rail assembly 38 is then assembled and positioned on the log 24. The guide rail members 250 should extend six inches beyond each end of the log 24. The distance between the top of the guide rail assembly and the centerline is measured at both ends. This distance should be the same at each end. The height of the guide rail assembly can be adjusted by moving the plate members 254 in toward the log 24 which will raise the guide assembly or out and away from the log 24 which will lower the guide rail assembly and then suitably secured by driving the spikes 256 into the log. An alternative to the guide rail assembly 38, a substantially flat board might be nailed to the top of the log 24.

The platen 36 of the portable saw mill 20 is adjusted for the proper depth of cut. The engine 30 is started and the portable saw mill 20 is placed on the guide rail assembly 38 such that the platen 36 is resting on the guide rail members 250. The operator begins moving the portable saw mill 20 along the log 24 by grasping the handles 48a,b and standing in back of the portable saw mill 20. The portable saw mill 20 should be placed on the guide rail assembly 38 such that the guide rollers 40 follow one of the guide rails 250. When the first cut is completed, it will preferably be parallel to the longitudinal center line. The portable saw mill 20 is then preferably lifted off the log 24 by two persons grasping the handles 48a,b and the ends 73a,b. At this point, the remainder of the log 24 can be sawed with the platen 36 riding directly on the previously cut surface of the log 24. If a person wishes to have a straight edge on the finished lumber, a side of the log 24 adjacent the previously cut side can be cut using the guide rail assembly 38. The guide rail assembly 38 is positioned on a side of the log 24 adjacent the side previously cut and is squared relative to the side previously cut. The side is then cut.

It will be appreciated that the present invention enables a log to be cut into boards of any desired dimension at the field site. The preferred embodiment of the present invention enables a full eighteen inch width to be cut and enables the thickness of the cut to be adjusted from one-eighth inch to five inches. The narrow kerf band saw provides for eighty percent less sawdust waste than circular blade or chain saw mills. The hand operated throttle provides for complete operator control. In the preferred embodiment, a centrifigal clutch is utilized to stop the blade as required for operational safety. The preferred embodiment can be further utilized with a conventional gas engine such as five horsepower four cycle gasoline engine equipped with a spark arrestor muffler. The preferred embodiment of the present invention is readily portable, having a weight of roughly one hundred sixty pounds and overall dimensions of roughly sixty inches wide, twenty nine inches deep, twenty four inches high.

It is to be understood, however, that even though these numerous characteristics and advantages of the invention have been set forth in the foregoing description, together with details of the structure and function of the invention, the disclosure is illustrative only and changes may be made in detail, especially in matters of shape, size and arrangement of parts, within the principle of the invention.

What is claimed is:

1. A portable saw mill for cutting lumber from a log, comprising:
   (a) a frame adapted to be disposed transversely of the log;
   (b) a pair of horizontally spaced apart wheels adapted to straddle the log, the wheels being rotatably supported by the frame for rotation in a vertical plane;
   (c) a band saw blade positioned around the wheels for movement transversely of the log;
   (d) means for rotating at least one of the wheels to cause the blade to form a cut in the log as the frame is moved longitudinally along the log;
   (e) vertically adjustable support base means for supporting the frame relative to a top surface of the log so as to enable vertical adjustment of the band saw blade relative to the top surface of the log, the support base means including a platen, a pedestal interconnected to the platen having a plurality of substantially horizontal, vertically adjustable legs for supporting and leveling the platen, and handle means interconnected to the pedestal for vertical adjustment of the support base;
   (f) a guide roller interconnected to the frame and adaptable to various shaped logs, said roller being movable longitudinally upon the log as it is being cut for guiding the frame along the log as the frame advances whereby the blade is kept in a zone of cutting as the blade cuts the log lengthwise; and
   (g) handle means interconnected to the frame for facilitating movement of the frame longitudinally of the log by a user.

2. A portable saw mill for cutting lumber from a log, comprising:
   (a) a frame adapted to be disposed transversely of the log, wherein the frame includes three rail members extending transversely of the log, a first pair of the rail member interconnecting and straddling the wheels, at least one of the wheels being slideably mounted on the rail members, a third one of the rail members lying in the vertical plane of the wheels so as to be in alignment therewith, the third one of the rail members including tension means for adjusting blade tension by adjusting the spacing between the wheels;
   (b) a pair of horizontally spaced apart wheels adapted to straddle the log, the wheels being rotatably supported by the frame for rotation in a vertical plane;
   (c) a band saw blade positioned around the wheels for movement transversely of the log;
   (d) means for rotating at least one of the wheels to cause the blade to form a cut in the log as the frame is moved longitudinally along the log;
   (e) vertically adjustable support base means for supporting the frame relative to a top surface of the log so as to enable vertical adjustment of the band saw blade relative to the top surface of the log;
   (f) guide means interconnected to the frame for guiding the frame along the log as the frame advances whereby the blade is kept in a zone of cutting as the blade cuts the log lengthwise;
   (g) the support base means including a platen and means for leveling the platen relative to the saw blade; and
   (h) handle means interconnected to the frame for facilitating movement of the frame longitudinally of the log by a user.

3. A portable sawmill in accordance with claim 1, wherein one of the wheels includes blade tracking adjustment means for adjustably aligning the wheels with the blade whereby the blade properly tracks the wheels.

4. A portable sawmill in accordance with claim 3, wherein the blade tracking adjustment means includes eccentric means interconnected to the wheel for moving the wheel in a horizontal plane relative to the blade whereby the blade can be made to ride evenly on the wheel.

5. A portable sawmill in accordance with claim 2, wherein the blade tension means includes spring biasing means.

6. A portable sawmill in accordance with claim 5, wherein the spring biasing means includes a plurality of dishwashers and cooperating adjustment nut means for varying the spacing between the wheel.

7. A portable sawmill in accordance with claim 1, wherein the means for rotating at least one of the wheels includes an internal combustion motor mounted on the frame and means for rotatably adjusting the internal combustion motor, whereby the motor can be positioned in an upright position even though the orientation of the frame might change.

8. A portable sawmill in accordance with claim 7, further including cooperating support frame means for vertically supporting the frame whereby the wheels are vertically aligned.

9. A portable sawmill in accordance with claim 1, further including cooperating guide rail assembly means positioned longitudinally of the log for cooperating with the guide means to guide the frame of the portable sawmill as the frame advances longitudinally of the log.

10. A portable sawmill in accordance with claim 9, the guide rail assembly including two spaced apart guide rails extending longitudinally of and straddling the log and bracket means for mounting the rails in a predetermined spaced relationship, the rail assembly means including means for fixedly securing the rail assembly means to the log to prevent longitudinal movement thereof.

* * * * *

UNITED STATES PATENT AND TRADEMARK OFFICE
CERTIFICATE OF CORRECTION

PATENT NO. : 4,711,032

DATED : December 8, 1987

INVENTOR(S) : Rickmers et al.

It is certified that error appears in the above-identified patent and that said Letters Patent is hereby corrected as shown below:

Column 6, line 8, "buide" should be --guide--

Column 7, line 58, after "covers" insert --230,234--

Column 8, line 4, "is" should be --as--

Column 9, line 46, "member" should be --members--

Signed and Sealed this

Ninth Day of August, 1988

Attest:

DONALD J. QUIGG

Attesting Officer

Commissioner of Patents and Trademarks